US007117573B1

(12) United States Patent
Hu

(10) Patent No.: US 7,117,573 B1
(45) Date of Patent: Oct. 10, 2006

(54) PULLER

(76) Inventor: Chih Kuo Hu, No.28, Lane 237, Wucyuan 5th St., West District, Taichung City 403 (TW)

( * ) Notice: Subject to any disclaimer, the term of this patent is extended or adjusted under 35 U.S.C. 154(b) by 0 days.

(21) Appl. No.: 11/126,195

(22) Filed: May 11, 2005

(51) Int. Cl.
*B23P 19/04* (2006.01)

(52) U.S. Cl. .................................................. 29/261

(58) Field of Classification Search .................. 29/261, 29/262, 259, 260, 246
See application file for complete search history.

(56) References Cited

U.S. PATENT DOCUMENTS 1,043,400 A * 11/1912 Collison ...................... 29/261
1,552,616 A * 9/1925 Kister ......................... 29/261

* cited by examiner

*Primary Examiner*—Robert C. Watson
(74) *Attorney, Agent, or Firm*—Rosenberg, Klein & Lee

(57) ABSTRACT

A puller allowing easy and readily replacement of the jaws within a confined area is comprised of a threaded rod, a drive mechanism, an activation mechanism, and multiple jaws; provided with an auxiliary connecting arm and an auxiliary fixing arm respectively to a connecting base and a bolting base for a connecting arm extending from a connecting base and a bolting base; any jaw being retractable to be respectively connected to the auxiliary connecting arm and the auxiliary fixing arm; a winged nut being turned to draw the auxiliary connecting arm and its corresponding connecting arm, thus to grab a work piece by its circumference while a centering end of a threaded rod holding against the axis of the work piece to remove it.

4 Claims, 5 Drawing Sheets

PULLER

BACKGROUND OF THE INVENTION (a) Field of the Invention

The present invention is related to a puller, and more particularly to one that allows easy replacement of jaws depending on the conditions of work environment.

(b) Description of the Prior Art

As illustrated in FIG. 5 of the accompanying drawings, a puller of the prior art is applied in the replacement or assembly operation of a work piece by holding the circumference of work piece to remove the work piece by pushing a cylindrical rod against it.

The prior art is essentially comprised of a puller 7 having disposed at its center a threaded rod 8 and outwardly extending from its center three fixed arms 71; a connection holder 9 is provided at where below the puller 7; a connecting arm 91 extending from each fixed arm 71; a jaw 92 is pivoted to the terminal of each connecting arm 91; a spring 82 of the threaded rod 8 is inserted onto the puller 7; and a knob 81 is screwed to where above the spring 82. Accordingly, by turning the knob 81 to push against the spring 82, the puller 7 is driven to close in all three jaws 92 to grab the work piece.

In practice, three jaws are pulled to clamp the work piece and the knob 81 is adjusted to where appropriately to provide sufficient clamping force to three jaws; and the threaded rod 8 pushes against the mandrel to remove it.

However, in a confined space where the work piece is located, three jaws 92 are prevented from clamping the work piece at the same time, or any jaw 92 fails to exercise normal clamping as contained by the structure in the vicinity of the work piece. Therefore, the puller with three jaws must be removed and another puller with two jaws is needed. As a result, it's time and efforts consuming work to replace the puller. Furthermore, it takes extra room and money to have both of the puller with three jaws and another with two jaws.

SUMMARY OF THE INVENTION

The connecting purpose of the present invention is to provide a puller. Wherein, an auxiliary connecting arm is provided to a connecting base for a selected connecting arm extending from a connecting base; and an auxiliary fixed arm is provided to a bolting base for a selected connecting arm extending from the bolting base. Any jaw is removed to respectively connect to the auxiliary connecting arm and the auxiliary fixed arm. The winged nut is turned to drive the connecting base to draw the auxiliary connecting arm and its corresponding connecting arm to respectively drive the jaws respectively linked to them to grab the work piece at its circumference while the centering end is holding against the axis of the work piece to facilitate working in a confined space by immediately removing any jaw without retreating the existing puller for installation of another puller.

To achieve the purpose, the present invention includes a threaded rod disposed at its upper end a working nut and at its lower end a centering end; a drive mechanism containing a puller and a winged nut, a head is provide to the puller and multiple arms extending downward at the other end in the same direction, a slot is provided penetrating through the head of the puller, the winged nut pivoted to the slot is fastened to the threaded rod at where closer to the working nut, and the threaded rod also penetrates through the slot for the centering end of the threaded rod to hold against the axis of the work piece; and an activation mechanism comprised of a connecting base and a bolting base.

The connecting base penetrates through the threaded rod at where close to the centering end of the threaded rod and is respectively fixed to each expansion arm while multiple connecting arms extend outwardly from the center at a given spacing among one another.

The bolting base is provided to the threaded rod at where between the head of the puller and the connecting base, and multiple fixing arms corresponding to those connecting arms outwardly extend from the center of the bolting base at a given spacing among one another. The length of each fixing arm is greater than that of the connecting arm extending from the connecting base.

A jaw is each pivoted to the terminal of the fixing arm of the bolting base and an activation arm is pivoted to the mid of the jaw while each activation arm is pivoted to the connecting arm extending from the connecting base.

One auxiliary connecting arm is disposed to the connecting base for a given connecting arm extending from the connecting base, and an auxiliary fixing arm is provided to the bolting base for a given connecting arm extending from the bolting base. Wherein, any of the jaws is retractable, and the jaw so removed is adaptable to the auxiliary connecting arm and the auxiliary fixing arm.

The winged nut is turned to drive the connecting base to draw the connecting arm adapted to the auxiliary connecting arm and its corresponding auxiliary connecting arm, thus to respectively drive the jaws connected to them to grab the work piece by its circumference while the centering end of the threaded rod holds against the axis of the work piece.

The primary purpose, other purposes and advantages of the present invention can be better understood from those detailed description of the preferred embodiments and their accompanying drawings. Of course, certain parts or their arrangement may vary, however, preferred embodiments of the present invention are given detailed description and their constructions are illustrated in the accompanying drawings.

DETAILED DESCRIPTION OF THE PREFERRED EMBODIMENTS

Figure 1:
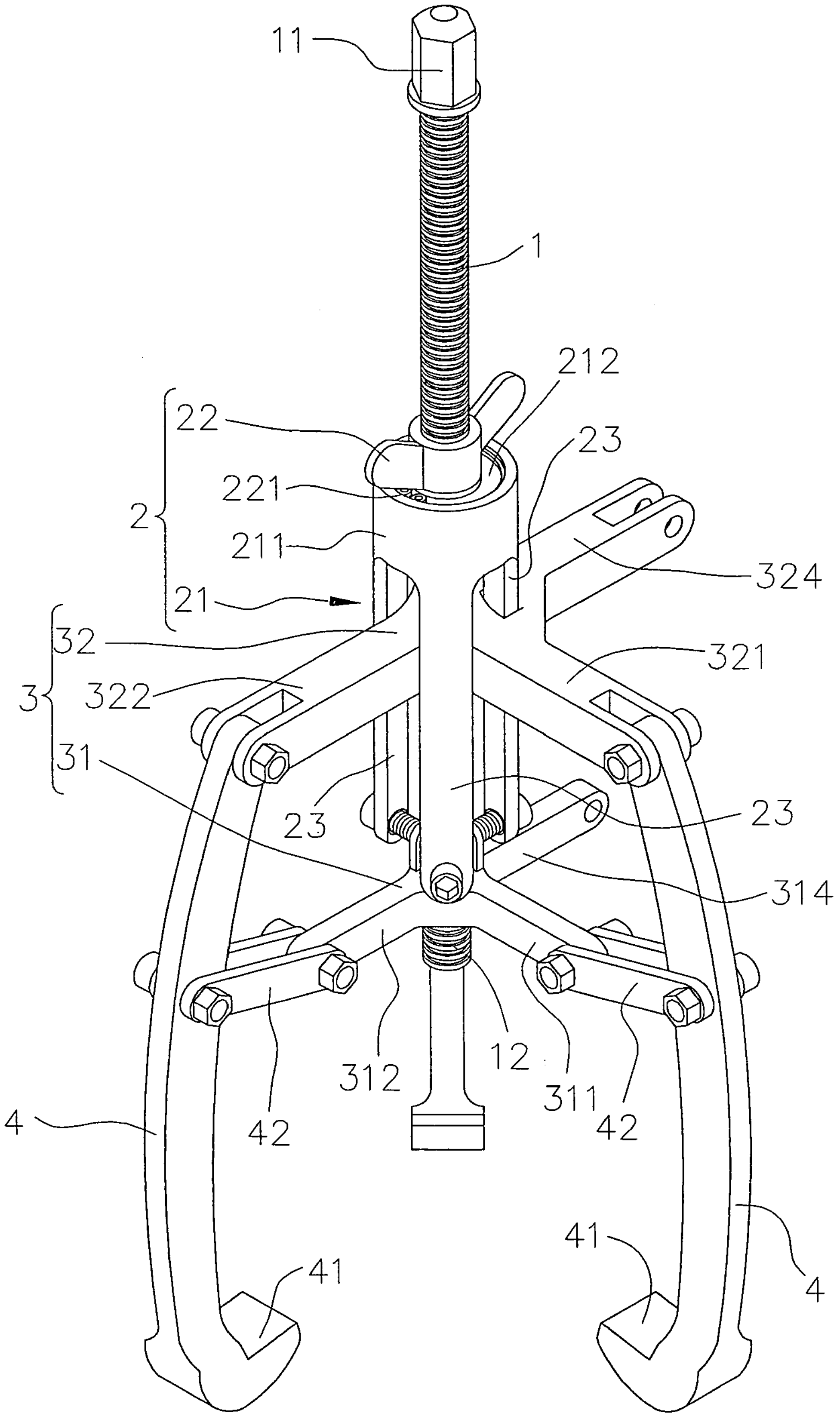
FIG. 1 is a perspective view of a first preferred embodiment of the present invention.

Referring to FIG. 1, a first preferred embodiment of the present invention includes a threaded rod 1, a drive mechanism 2, an activation mechanism 3, and three jaws 4. The threaded rod 1 is provided with a working nut 11 at it upper end and a centering end 12 at its lower end. The drive mechanism 2 contains a puller 21 and a winged nut 22. A head 211 extends from the upper end of the puller 21 and three arms 23 extending in the same direction vertically from the lower end of the puller. A slot 212 penetrating the head 211 of the puller 21 is disposed at its top a ring groove (not illustrated) to be locked by a C-clamp 221 for the winged nut 22 to be pivoted into the slot 212. Meanwhile, the winged nut 22 is fastened to the threaded rod 1 at where close to the working nut 11 and the threaded rod 1 penetrates through the slot 212 for the centering end 12 of the threaded rod 1 to hold against the axis of a work piece. The activation mechanism 3 includes a connecting base 31 and a bolting base 32. The connecting base 31 penetrates through the threaded rod 1 at where close to its centering end 12 and is respectively fixed to the terminal of each arm 23. Three connecting arms 311, 312, 313 outwardly extend from the connecting base 31 at an equal spacing among one another. By compromising those three connecting arms 311, 312, 313, three fixed arms 321, 322, 323 are disposed to the second base 32 at where between the head 211 of the puller 21 and the connecting base 31 each in a length greater than its corresponding connecting arm 311, 312, 313.

Each fixed arm 321, 322, 323 is pivoted at its terminal to one end of the corresponding jaw 4. Another end of the jaw 4 is provided with a hook 41. An activation arm 42 comprised of two plates is pivoted to the mid section of the jaw 4 on one end and pivoted to the connecting arm 311, 312, 313 on the other end.

In conjunction with the connecting arm 312 of the connecting base 31, an auxiliary connecting arm 314 is provided to the connecting base 31. In conjunction with the fixed arm 322 of the bolting base 32, an auxiliary fixed arm 324 is provided to the bolting base 32. Wherein, one from those jaws 4 is made retractable and the removed jaw is then respectively adaptable to the auxiliary connecting arm 314 and the auxiliary fixed arm 324.

Figure 2:
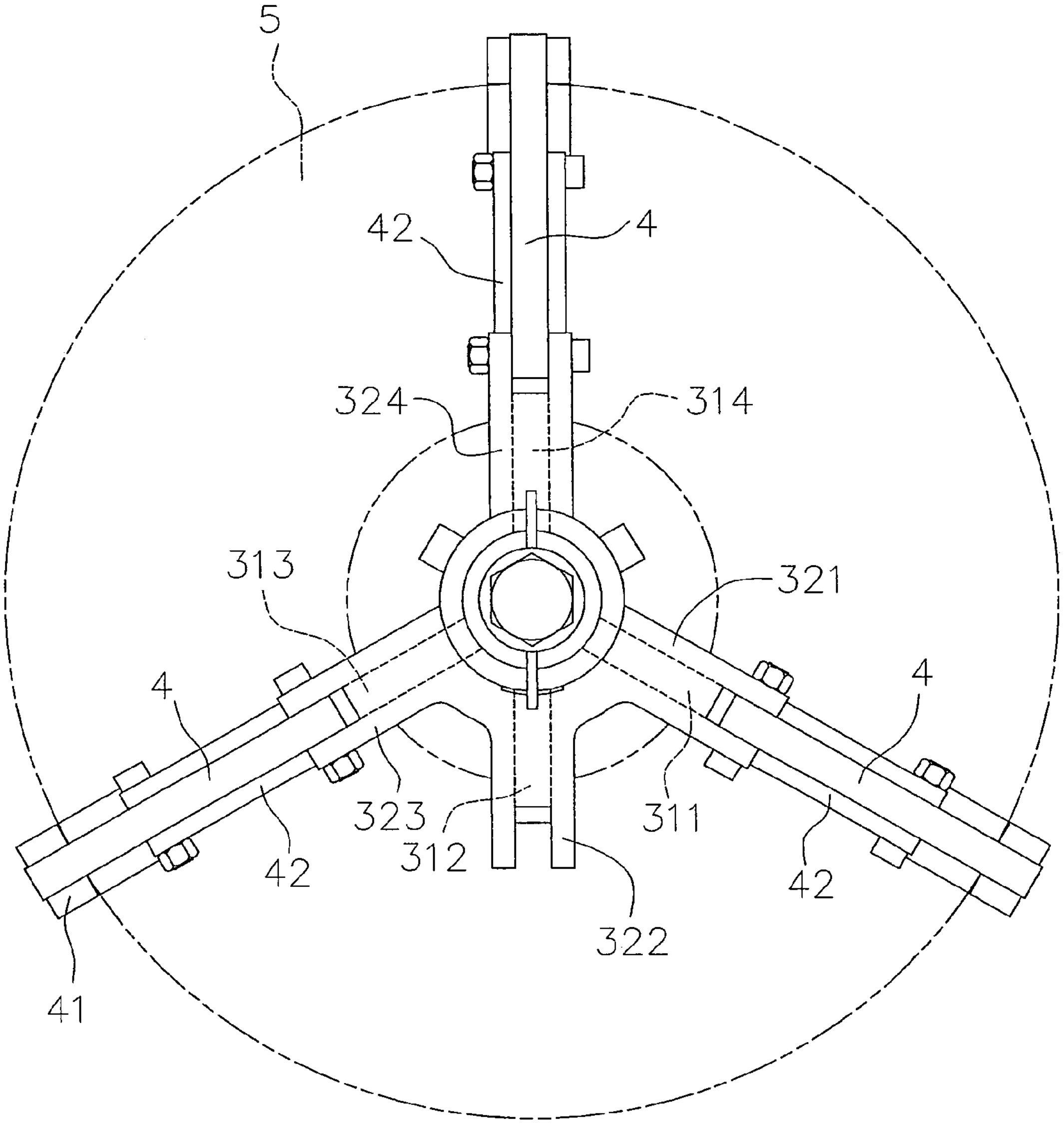
FIG. 2 is a schematic view showing operation of the jaws of the first preferred embodiment of the present invention to clamp a work piece.

As illustrated in FIGS. 1 and 2, the winged nut 22 is turned to bringing both of the connecting base 31 and the bolting base 32 to come close to each other thus to draw each hook 41 of the jaw 4 to grab a work piece 5 by its circumference while the centering end 12 of the threaded bolt 1 is holding against the work piece 5; and then the working nut 11 is turned to push the centering end 12 to hold against the axis of the work piece 5 to remove the work piece 5.

Accordingly, the present invention is applicable to a puller provided with three jaws to grab and remove the work piece 5.

Figure 3:
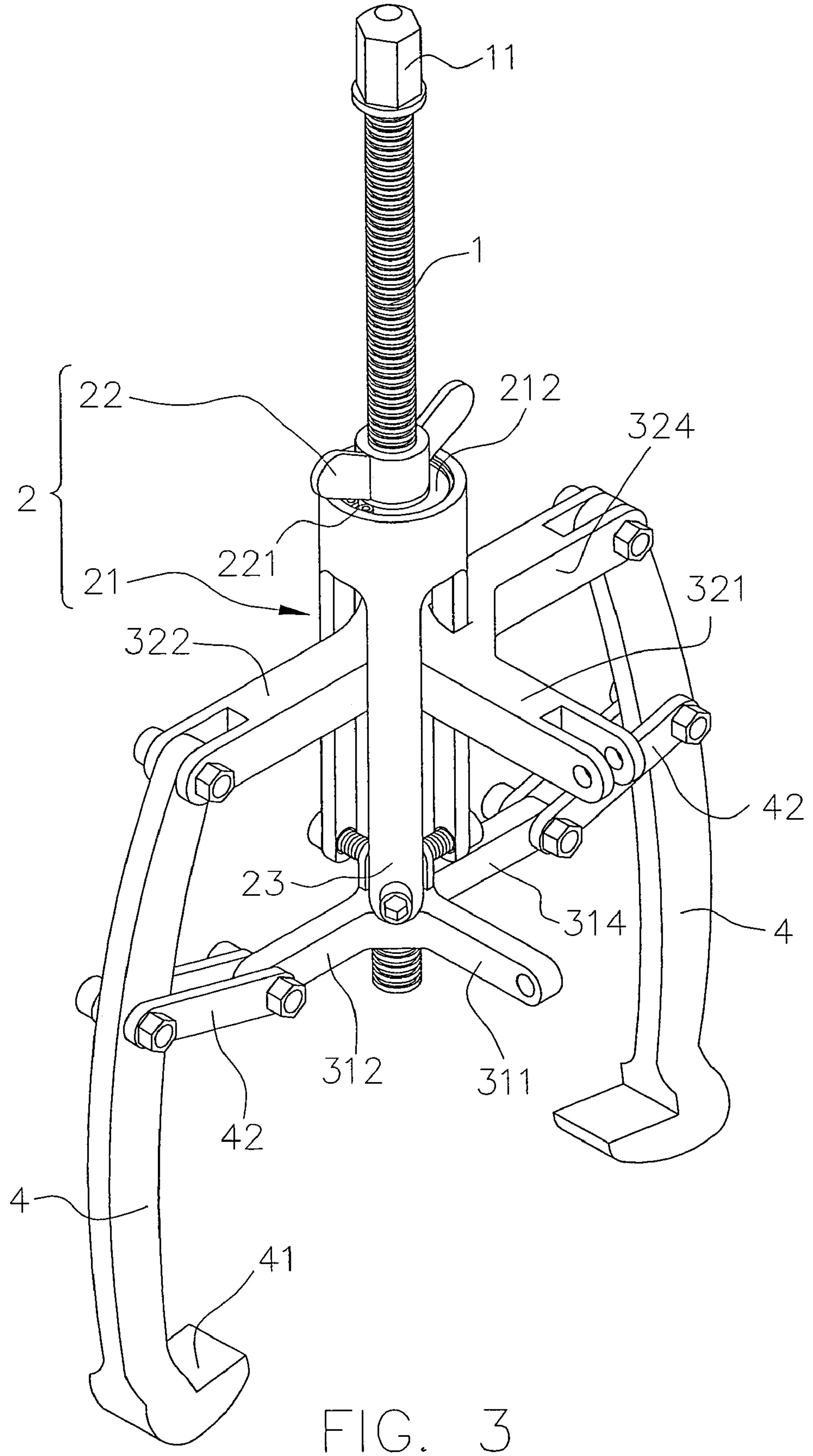
FIG. 3 is a perspective view of a second preferred embodiment of the present invention.
Figure 4:
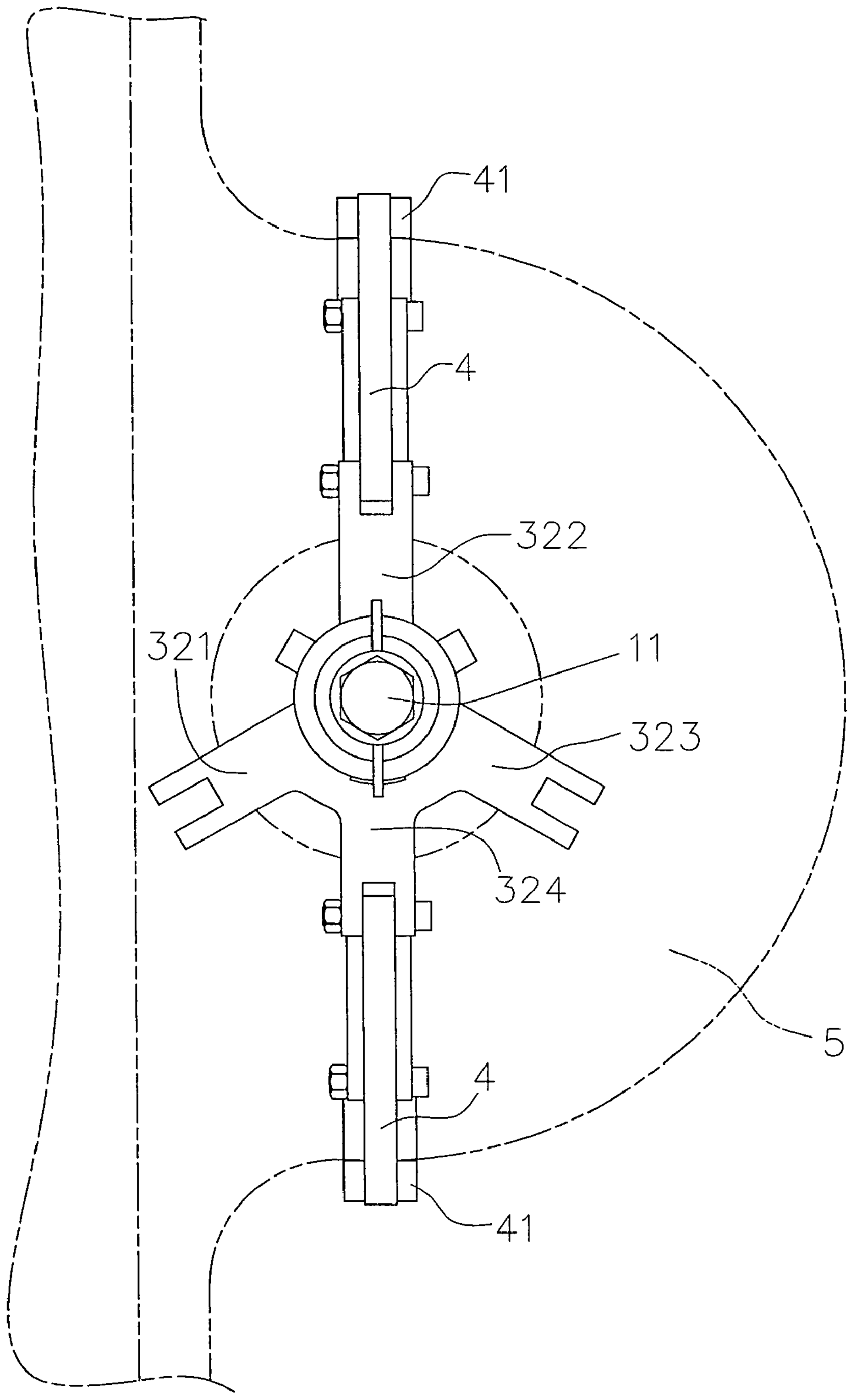
FIG. 4 is a schematic view showing operation of the jaws of the second preferred embodiment of the present invention to clamp a work piece.
Figure 5:
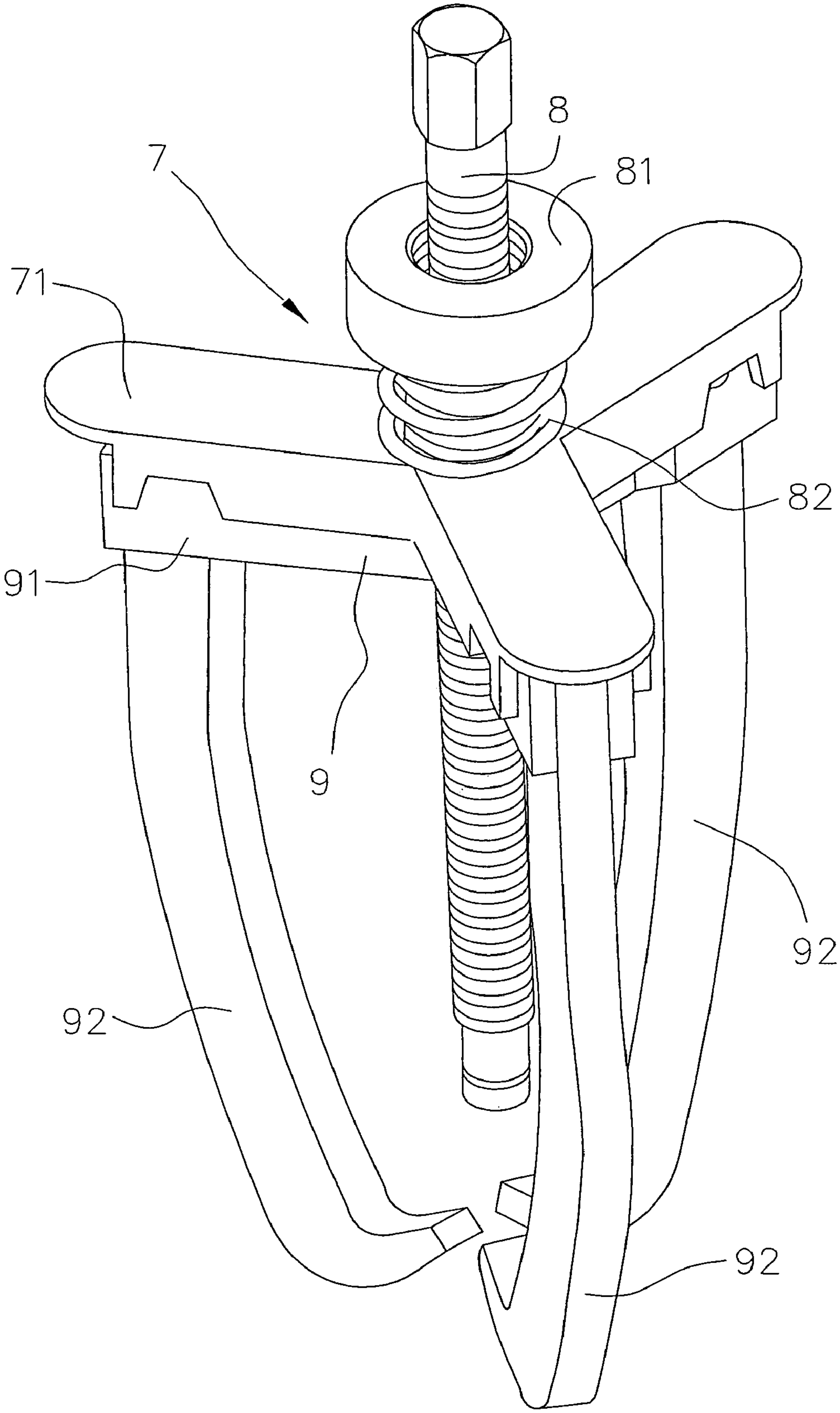
FIG. 5 PRIOR ART
FIG. 5 is a perspective view of the prior art.

In case of a confined space or any obstacle caused by other mechanism at where the work piece 5 is located that prevents the use of a puller with three jaws 4, a second preferred embodiment as illustrated in FIGS. 3 and 4 has its two jaws 4 removed to leave only one jaw 4 to respectively adapted to the auxiliary connecting arm 314 and the auxiliary fixed arm 324.

Again, the winged nut 22 is turned to bring both of the bolting base 32 and the connecting base 31 to come closer to each other to draw the auxiliary connecting arm 314 and its corresponding connecting arm 312 to respectively drive the jaw 4 to grab the circumference of the work piece 5 with its hook 41; and then the working nut 11 is turned to push the centering end 12 to holding against the axis of the work piece 5.

Therefore, in the confined space where the work piece 5 is located and a puller with three jaws is used, the puller can be readily converted into a puller with two jaws 4 to save the costs otherwise required in maintaining two different pullers and to save the space for the storage otherwise required for two different pullers. Furthermore, the easy conversion from three jaws 4 to two jaws 4 gives the optimal work efficiency within the least time.

I claim:

1. A puller comprising a threaded rod, a drive mechanism receiving the threaded rod and an activation mechanism threadedly engaged with the threaded rod; the threaded rod having a working nut disposed at its upper end and a centering end at an opposing end of the threaded rod to engage a work piece at an axis thereof; the drive mechanism containing a puller and a winged nut, the puller having a head and multiple arms extending downwardly from the head, the head having an opening through which the threaded rod passes, the winged nut being disposed in the opening and being fastened to the threaded rod; the activation mechanism including a connecting base and a bolting base, the connecting base being respectively fixed to the multiple arms of the puller and threadedly engaged with the threaded rod; the connecting base having three connecting arms extending outwardly from a central portion of the connecting base in equal angularly spaced relationship one from another, and an auxiliary connecting arm extending from the central portion of the connecting base in a direction diametrically opposed to one of the three connecting arms; the bolting base being threadedly engaged to the threaded rod to be displaceably disposed between the head of the puller and the connecting base, the bolting base having three fixed arms extending outwardly from a central portion thereof and in angular correspondence with the three connecting arms; the bolting base having an auxiliary fixed arm extending outwardly from the central portion of the bolting base and in angular correspondence with the auxiliary connecting arm, a length of each of the three fixed arms being greater than a length of the three connecting arms extending from the connecting base, and a length of the auxiliary fixed arm being greater than a length of the auxiliary connecting arm; a plurality of jaws selectively respectively connected to the three connecting arms and the three fixed arms or one of the plurality of jaws being selectively connected to the auxiliary fixed arm and the auxiliary connecting arm and another of the jaws being connected to the diametrically opposed connecting arm and corresponding fixed arm, each jaw being pivotally connected to a distal end of a respective fixing arm of the bolting base and an activation arm being pivotally coupled between an intermediate portion of the jaw and a distal end of a corresponding connecting arm extending from the connecting base.

2. The puller of claim 1, wherein, each jaw has a hook formed at a distal end thereof.

3. The puller of claim 1, wherein the activation arm is formed of two plates.

4. The puller of claim 1, wherein a C-clamp is engaged in the opening in the head of the puller to pivotally retain the winged nut in the opening.

* * * * *